(12) United States Patent
Sarfaty et al.

(10) Patent No.: US 10,826,784 B2
(45) Date of Patent: Nov. 3, 2020

(54) HIGH DEFINITION, SCALABLE NETWORK MONITORING AND DEBUGGING IN REAL-TIME

(71) Applicant: Mellanox Technologies, Ltd., Yokneam (IL)

(72) Inventors: Shahar Sarfaty, Haifa (IL); Dror Bohrer, Nesher (IL); Eitan Zahavi, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 35 days.

(21) Appl. No.: 16/246,505

(22) Filed: Jan. 13, 2019

(65) Prior Publication Data

US 2019/0229999 A1 Jul. 25, 2019

Related U.S. Application Data

(60) Provisional application No. 62/619,932, filed on Jan. 22, 2018.

(51) Int. Cl.
*H04L 12/24* (2006.01)
*H04L 12/26* (2006.01)

(52) U.S. Cl.
CPC .......... *H04L 41/14* (2013.01); *H04L 41/0609* (2013.01); *H04L 43/0817* (2013.01); *H04L 43/106* (2013.01); *H04L 43/16* (2013.01)

(58) Field of Classification Search
CPC ..... G06F 16/95–16/9574; H04L 67/00–67/42; H04L 41/14–41/147; H04L 41/06–41/0627; H04L 43/08–43/0894; H04L 43/10–43/18
See application file for complete search history.

(56) References Cited

U.S. PATENT DOCUMENTS

| | | | |
|---|---|---|---|
| 5,796,633 A | 8/1998 | Burgess et al. | |
| 7,668,107 B2 | 2/2010 | Arad et al. | |
| 8,195,478 B2 | 6/2012 | Petersen et al. | |
| 8,639,802 B2 | 1/2014 | Zhou | |
| 10,111,126 B2 | 10/2018 | Toskala et al. | |
| 2006/0265501 A1 | 11/2006 | Gorodyansky | |
| 2009/0227251 A1* | 9/2009 | Lei | H04J 11/0069 455/425 |
| 2011/0045821 A1 | 2/2011 | Tyce et al. | |
| 2013/0290783 A1* | 10/2013 | Bowler | H04L 41/0681 714/25 |

(Continued)

OTHER PUBLICATIONS

Pekar et al., "Survey of the issues surrounding network traffic monitoring", 11th International Conference on Wireless 20 Communications, Networking and Mobile Computing (WiCOM ), 8 pages, Sep. 21-23, 2015.

*Primary Examiner* — Clayton R Williams
(74) *Attorney, Agent, or Firm* — Kligler & Associates Patent Attorneys Ltd (57) ABSTRACT

A method includes, in a Network Interface Controller (NIC) that communicates over a network, generating indications pertaining to a performance of the NIC. The indications are classified with respect to severity. At least some of the indications, for which the severity exceeds a predefined severity threshold, are assembled in performance notification packets. The performance notification packets are sent over the network.

14 Claims, 4 Drawing Sheets

(56) References Cited

U.S. PATENT DOCUMENTS

| | | | |
|---|---|---|---|
| 2015/0261642 A1* | 9/2015 | Gottlib | H04L 41/0677 714/48 |
| 2017/0353363 A1* | 12/2017 | Parker | H04L 41/12 |
| 2018/0152474 A1* | 5/2018 | Winquist | H04L 63/1458 |

* cited by examiner

HIGH DEFINITION, SCALABLE NETWORK MONITORING AND DEBUGGING IN REAL-TIME

CROSS-REFERENCE TO RELATED APPLICATIONS

This application claims the benefit of U.S. Provisional Patent Application 62/619,932, filed Jan. 22, 2018, whose disclosure is incorporated herein by reference.

FIELD OF THE INVENTION

The present invention relates generally to communication networks, and particularly to performance monitoring in communication networks.

BACKGROUND OF THE INVENTION

Network performance monitoring is typically done by querying the status of network nodes, analyzing and logging the results, and alerting users (such as system administrators) when the system reaches critical operating conditions. See, for example, "Survey of the issues surrounding network traffic monitoring," by Pekar and Chovanec, 11th International Conference on Wireless Communications, Networking and Mobile Computing (WiCOM 2015), Sep. 21-23, 2015. The paper surveys exiting network monitoring from several aspects and suggests a direction for future developments.

SUMMARY OF THE INVENTION

An embodiment of the present invention that is described herein provides a method including, in a Network Interface Controller (NIC) that communicates over a network, generating indications pertaining to a performance of the NIC. The indications are classified with respect to severity. At least some of the indications, for which the severity exceeds a predefined severity threshold, are assembled in performance notification packets. The performance notification packets are sent over the network.

In an embodiment, sending the performance notification packets includes evaluating a sending criterion, and sending the Notification Packets when the sending criterion is met. In some embodiments, evaluating the sending criterion includes evaluating a size of a performance notification packet. In other embodiments, evaluating the sending criterion includes evaluating a time elapsed since a last performance notification packet was sent. In yet another embodiment, evaluating the sending criterion includes evaluating the severity of a performance indicator.

In some embodiments, assembling the indications includes compressing the indications. In other embodiments, assembling the indications includes adding one or more time-stamps to the Performance Notification packets.

There is additionally provided, in accordance with an embodiment of the present invention, a Network Interface Controller (NIC) including one or more ports for communicating over a network, and circuitry. The circuitry is configured to generate indications pertaining to the performance of the NIC, to classify the indications with respect to severity, to assemble at least some of the indications, for which the severity exceeds a predefined severity threshold, in Performance Notification packets, and to send the Performance Notification packets over the network.

The present invention will be more fully understood from the following detailed description of the embodiments thereof, taken together with the drawings in which:

DETAILED DESCRIPTION OF EMBODIMENTS

Overview

According to embodiments of the present invention, a system that monitors and analyzes network performance comprises monitored network elements (such as servers or other network endpoints), which send network performance messages; and a performance monitoring server (that may be an aggregation of a plurality of servers), which logs and analyzes the network performance messages.

In some embodiments according to the present invention, Network Interface Controllers (NICs) of the monitored servers comprise circuitry configured to monitor the performance of the NIC and generate performance indicators; to classify the performance indicators according to preset criteria; to assemble performance notification packets; and, to send the notification packets when some preset thresholds are exceeded.

According to some embodiments, The NIC comprises a High Definition Monitoring unit, which monitors several aspects of the NIC performance, and generates respective performance indicators, at high time definition (i.e., at short time intervals). The monitored aspects may comprise, for example, buffer occupancy in the receive side, miss rate in the L2 cache, and occupancy of buffers in the interface between the hardware and the software, to name just a few possible examples. In some embodiments additional aspects may be monitored, e.g., packet-drop count, miss rates in other cache levels, and environmental parameters such as ambient temperature and supply voltage level. In an embodiment, the performance indicators comprise values of counters and other registers of the NIC.

In some embodiments according to the present invention, the NIC further comprises a Classifier. The Classifier is configured to classify the performance indicators according to severity levels, wherein the severity level is calculated according to a preset rule, e.g., formula, using preset parameters.

In an embodiment, the classifier decides which performance indicators should be notified to the performance monitoring server, depending on the severity level of the performance indicators, wherein only performance indicators with severity level that is more than a first predefined threshold will be notified; and, wherein, performance indicators with severity level that is more than a second predefined threshold will be notified with high urgency (as will be described hereinbelow).

In some embodiments, the NIC further comprises a Packet Encapsulator, which is configured to receive performance indicators that should be notified (e.g. with severity level greater than the first threshold), encapsulate the performance indicators in performance-notification packets, and add time-stamps in the packet, pertaining to the time of occurrence of the performance indicators. In some embodiments, the Packet Encapsulator may compress the performance indicators prior to encapsulation. In an embodiment, the Packet Encapsulator may assemble a plurality of performance indicators in a single packet.

The Packet Encapsulator is further configured to send the performance notification packets, through an Egress port of the NIC and through the network, to the Performance Monitoring Server. After the Packet Encapsulator sends a performance notification packet, the Packet Encapsulator will encapsulate the next performance indicators in a new packet.

According to some embodiments of the present invention, the NIC further comprises a Scheduler, which is configured to control the Packet Encapsulator to send the performance notification packets. In embodiments, the Scheduler controls the Packet Encapsulator to send the Performance Notification packets in response to one or more of the following three events: 1. The size of the performance notification packet that the Encapsulator assembles is more than a preset threshold; 2. a preset time period has elapsed since the previous performance notification packet has been sent; and, 3. the severity level of the last received packet exceeds the second predefined severity level threshold.

According to embodiments of the present invention, the Packet Encapsulator sends Performance Notification packets to an egress port of the NIC, which sends the packet to the network. The Performance Monitoring server (or an aggregation of servers) then receives the performance notification packets from some or all the monitored servers. The Performance Monitoring server may then analyze, log or otherwise process the network performance.

In summary, NICs of servers that are coupled to a network may monitor the performance of the NICs at high time definition, classify the monitoring indicators, encapsulate important performance monitoring events in packets, and send the packets to a performance monitoring server. Thus, according to embodiments of the present invention, performance monitoring of the network is done at high timing definition and with modest communication overhead on the network.

System Description

Figure 1:
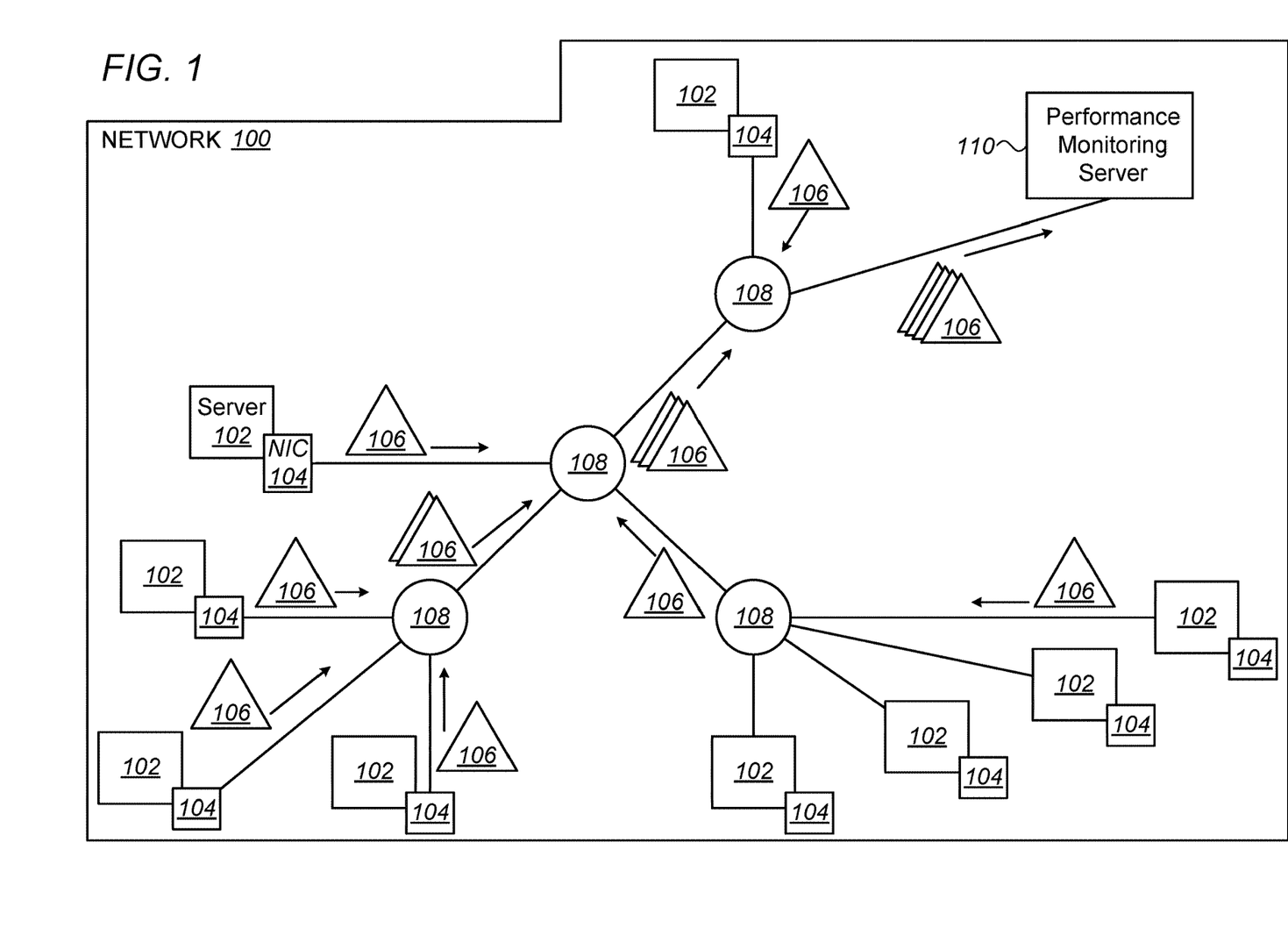
FIG. 1 is a block diagram that schematically illustrates performance monitoring in a network, in accordance with an embodiment of the present invention.

FIG. 1 is a block diagram that schematically illustrates performance monitoring in a network 100. The network comprises a plurality of monitored-servers 102, which are coupled to Network 100 through Network Interface Controllers (NICs) 104. To facilitate performance monitoring of Network 100, Monitored Servers 102 send Performance Notification Packets 106 over the network. Switches 108 route the Performance Notification Packets from all monitored servers to a Performance Monitoring Server 110.

Performance Monitoring Server 110 is configured to execute performance monitoring software programs that monitor the network performance. In some embodiments, the performance monitoring software may comprise additional tasks; for example, logging the performance monitoring data, generating graphic views, generating alerts, sending messages to network maintenance personnel, and publishing performance reports. The performance monitoring software may also poll the status of a server that generates severe performance notification packets, to get a better view of the monitored server's status.

Thus, according to the example embodiment of FIG. 1, the monitored servers push the Performance Notification Packets to the Performance Monitoring Server; the Performance Monitoring Server gets the performance notification from all monitored servers and executes performance monitoring software programs. As the notifications are pushed rather than periodically pulled, the load of the network will be relatively small.

As would be appreciated, network 100 described above is shown by way of example. Networks in accordance with the disclosed techniques are not limited to the description hereinabove. In alternative embodiments, for example, Performance Monitoring Server 110 may also be monitored. In other embodiments, the Performance Monitoring Server may comprise a plurality of aggregated servers. In yet other embodiments, some or all the performance monitoring software may execute on a separate computer that is coupled to the Performance Monitoring Server.

Figure 2:
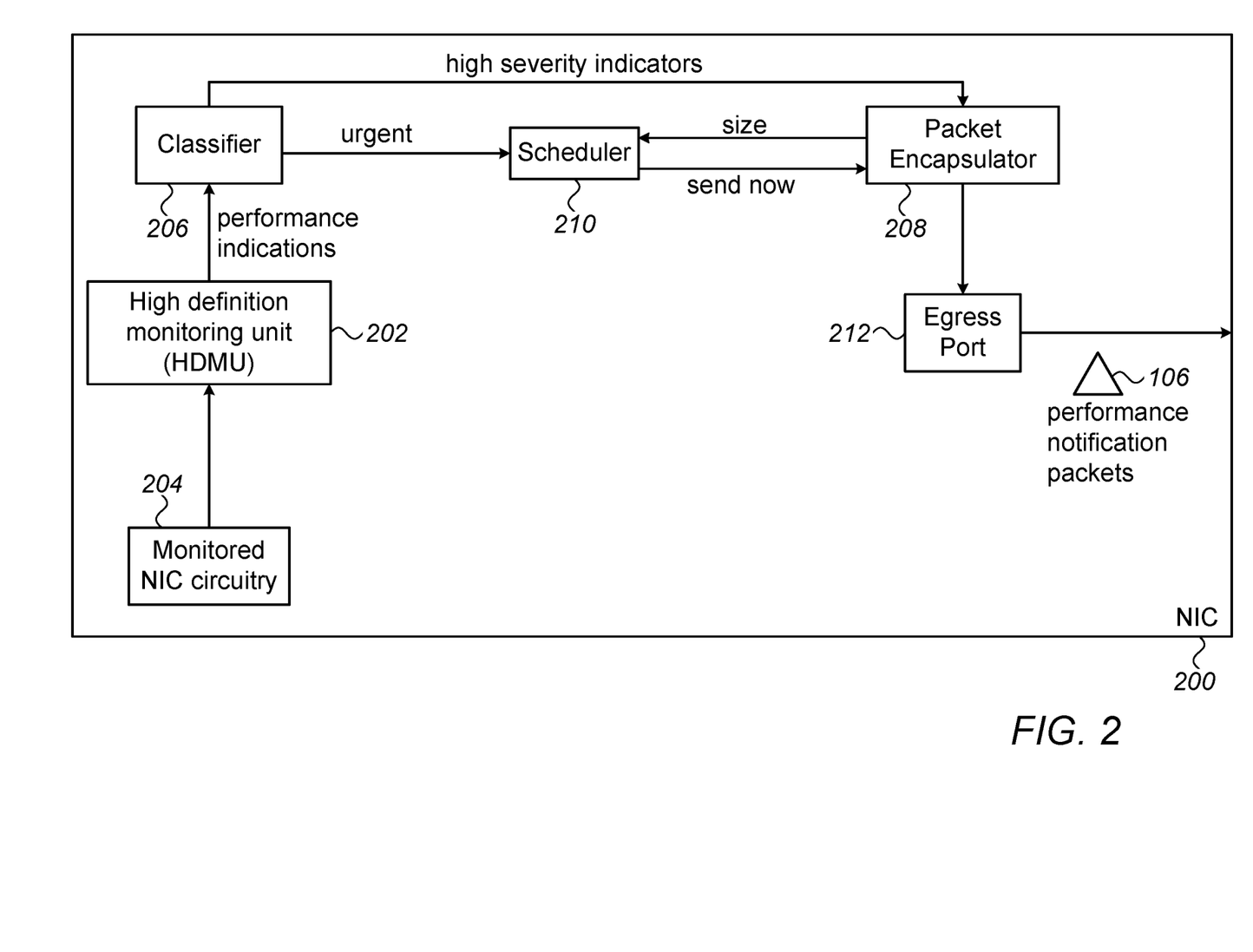
FIG. 2 is a block diagram that schematically illustrates a Network Interface Controller (NIC), in accordance with an embodiment of the present invention.

FIG. 2 is a block diagram that schematically illustrates a Network Interface Controller (NIC) 200, according to an embodiment of the present invention. The configuration of NIC 200 can be used, for example, to implement NICs 104 of Servers 102 in FIG. 1 above.

NIC 200 comprises a High Definition Monitoring Unit (HDMU) 202 that is coupled to a Monitored NIC Circuitry 204; a Classifier 206, a Packet Encapsulator 208, a Scheduler 210 and an Egress Port 212, which is configured to send Performance Notification Packets 106 to a Network (not shown). NIC 200 is typically also used for normal communication of the server over the network. Some NIC elements relating to transmission and reception of conventional packets are not shown in the figure, for clarity.

HDMU 202 is configured to monitor, at high definition (i.e., at short timing intervals), at least one aspect of the performance of Monitored NIC Circuitry 204. According to an embodiment, the performance aspects comprise one or more of:
1. Rx Buffer occupancy (when Rx Buffer is full, it may cause back pressure);
2. Peripheral Component Interconnect Express (PCIe) bandwidth utilization (when fully utilized, the PCIe interface may cause a bottleneck);
3. Receive Work Queue Elements (WQE) buffer state—when no Receive WQEs exist in the buffer, it may imply that the CPU of the server causes a bottleneck;
4. L2 cache miss-rate—when the miss-rate is high, L2 cache may be full and its performance degraded;
5. Receive pipe average latency per packet;
6. Number of steering hops per packet processing in the Receive pipe—steering hops count how many lookups need to be done in the memory while processing an arriving packet, in order to determine to which receive buffer the packet should be directed;
7. Memory Protection Table (MPT) cache-misses;
8. Transmit wait (TX Paused) threshold exceeded;
9. Explicit Congestion Notification (ECN) counters—number of Congestion Notification Packets, and number of congested drops;
10. Receive drops—how many packets were dropped in the Receive pipe;
11. A change of state in one of the state-machines of the NIC;

12. Ambient temperature of the NIC; and,

13. Supply voltage level.

In alternative embodiments, any other suitable performance parameters may be monitored.

HDMU 202 polls the state of the monitored NIC circuitry at high frequency (for good time resolution), and generates Performance Indications pertaining to the performance aspects. In an embodiment, the performance indicators comprise values of counters and other registers of the Monitored NIC Circuitry, pertaining to the performance aspects described hereinabove.

Classifier 206 classifies the performance indicators according to severity levels, wherein the severity level is calculated according to a preset rule, e.g., formula, using preset parameters. For example, each aspect of the performance may be assigned a severity scale from 1 to 10, and a weight that is less than 1. The sum of all weights is 1, and the severity level is calculated as the sum of the severity scales multiplied by the weights, for all performance aspects (i.e., the severity level is a weighted average of the severity scales of all aspects). Other suitable formulas for calculating the severity level may be used in alternative embodiments of the present invention.

The classifier then processes the performance indicators based on the severity level. In the example embodiment of FIG. 2, the classifier ignores all performance indicators whose severity level does not exceed a first severity threshold and sends only the other performance indicators (marked "high severity indicators") to Packet Encapsulator 208. The classifier also indicates to Scheduler 210 that performance indicators with a severity level that exceeds a second threshold (typically greater than the first threshold) are Urgent.

Packet Encapsulator 208 receives high severity performance indicators from Classifier 206 and assembles the indicators to packets. In some embodiments, the Packet Encapsulator compresses the performance indicators; in an embodiment, the Packet Encapsulator adds time-stamps in the packet, for example, after every performance indication, or after every preset number of indications. According to embodiments of the present invention, adding time stamps improves the time resolution of the performance monitoring. In another embodiment of the present invention the Packet Encapsulator may add time-stamps to the packet periodically.

When Packet Encapsulator 208 receives a Send Now indication (from Scheduler 210), the Packet Encapsulator may add other information to the packet, including, for example, packet length and Cyclic Redundancy Check (CRC), and send the resulting performance-notification packet 106, via Egress Port 212 to the network (the header of the packet typically comprises the address of the performance monitoring server in the destination field).

Scheduler 210 schedules transmission of the performance notification packets. According to the example embodiment of FIG. 2, the Scheduler indicates to the Packet Encapsulator that the current packet should be sent (by asserting the Send Now signal), in the earlier of three events: i) the size of the packet in the Packet Encapsulator exceeds a preset threshold; ii) a preset time period has elapsed since the Packet Encapsulator has sent the last performance notification packet; and, iii)—the Scheduler receives an Urgent indication from the Classifier (i.e., the last performance indication has a severity level greater than the second threshold).

The thresholds that are used may be configured with optimal values according to the nature of the network.

In summary, an HDMU monitors the performance of the NIC, and sends performance indications to a classifier that selects which notifications are sent. Time stamps may be added to the notifications, to improve the timing resolution of the performance monitoring. Urgent notifications are sent with minimal delay, whereas other notifications may be sent when the packet is long enough, or if the packet has been waiting to be sent long enough.

Thus, according to the example embodiment of FIG. 2, the self-analysis capability of the NIC is exploited—the NIC is self-aware of possible bottlenecks in the packets flow (e.g., in the RX buffer), and is configured to detect such bottlenecks, offloading this effort from the CPUs of either the local host or the performance monitoring server. The NIC performs the analysis/filtering of the events and sends only the significant events to the performance monitoring server. If not urgent, performance notification packets pertaining to a plurality of performance indications are assembled into a single packet, further lowering the load on the network and on the performance monitoring server. As the Packet Encapsulator adds time-stamps in the packet, the timing resolution of the performance monitoring is good.

As would be appreciated, the units of NIC 200 that monitor performance and send performance notification packets described herein, such as HDMU 202, Monitored NIC Circuitry 204, Classifier 206, Packet Encapsulator 208, and Scheduler 210, are cited by way of example. NICs in accordance to the disclosed techniques are not limited to the description hereinabove. In alternative embodiments, for example, the classifier may use different criteria, or classify the indicators into a different number of severity types. In some alternative embodiments, some or all the parameters such as thresholds and time periods may be adaptive, i.e.—periodically changed by the NIC and/or by the performance monitoring server. In embodiments, a different set of rules may be used to determine when the Packet Encapsulator sends performance notification packets. In some embodiments, some or all the units depicted in FIG. 2 may be implemented by software, by hardware, or by combination of software and hardware.

In the context of the present patent application and in the claims, all NIC elements other than port 212 are referred to jointly as "circuitry." Any suitable circuitry configuration can be used.

Figure 3:
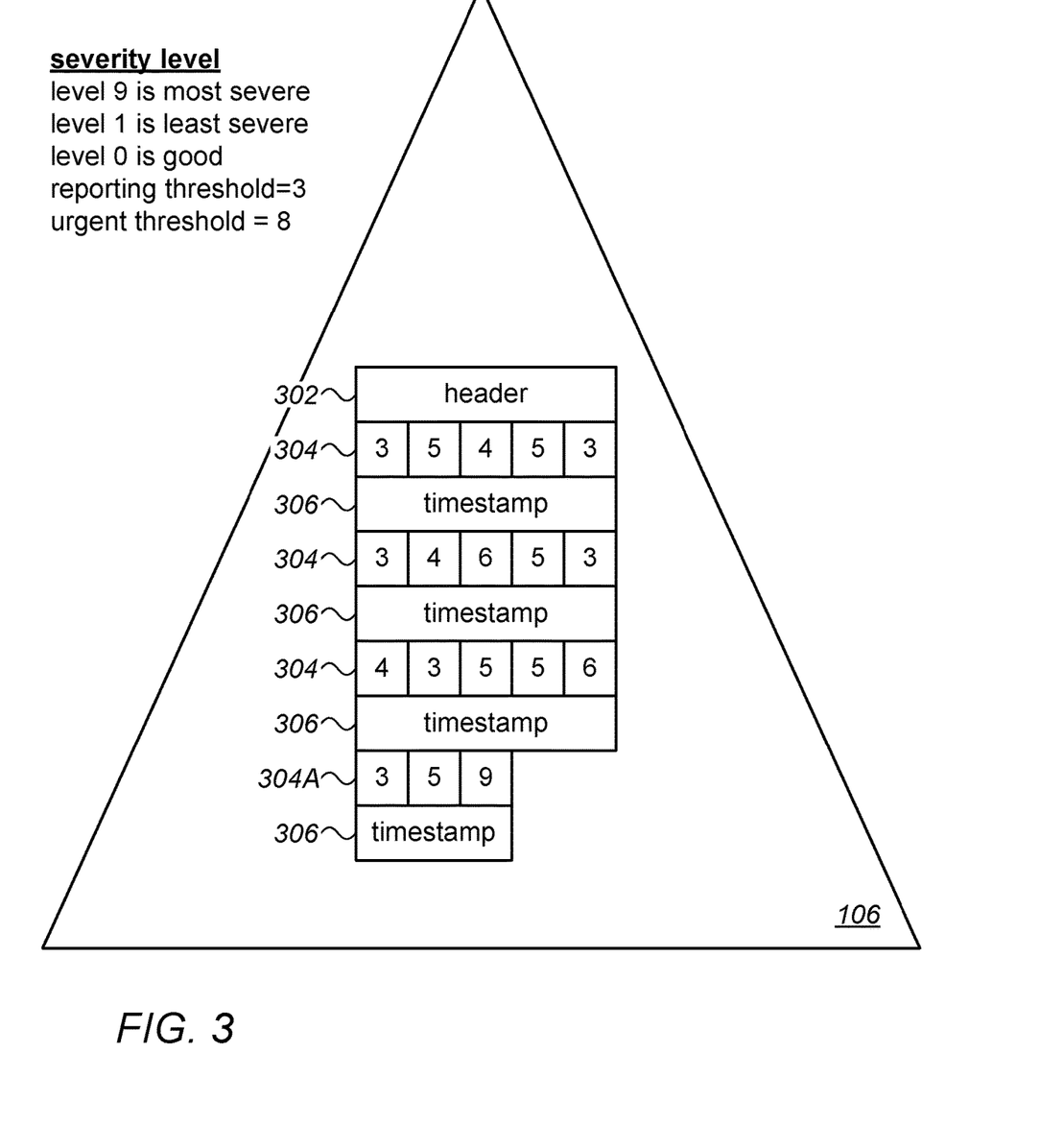
FIG. 3 is a diagram that schematically illustrates the contents of an example performance notification packet, in accordance with an embodiment of the present invention.

FIG. 3 is a diagram that schematically illustrates the contents of an example performance notification packet in accordance with an embodiment of the present invention. The packet comprises a Packet Header 302, performance notification fields 304, 304A, and time-stamps 306. Header 302 comprises fields as required by the network protocol, such as source and address destination, port identification, and others. Performance Notifications fields 304 comprise, according to the example embodiment of FIG. 3, five performance indications (except for Performance Notifications field 304A, which comprises three performance indications, and will be described hereinbelow). The severity level of each performance indicator in the performance notification fields is marked in the figure, with numbers from one to nine. Each Performance Notification Field 304, 304A is followed by time-stamp field 306.

According to the example embodiment of FIG. 3, performance indicators with severity level that is less than three are not reported; therefore, the numbers illustrated in performance notification fields 304 do not include numbers that are less than three.

According to the example embodiment of FIG. 3, performance indicators with severity level that is equal to or greater than eight are considered Urgent; therefore, in performance notification field 304, when a performance indicator with severity level of nine is accepted, the packet is immediately sent—that is—performance notification field 304A stops (and is, therefore, shorter than performance notification fields 304), a final time-stamp 306 is added, and the packet is sent.

As would be appreciated, the structure of performance notification packet 106 described herein, is cited by way of example. Performance Notification Packets in accordance to the disclosed techniques are not limited to the description hereinabove. In alternative embodiments, the number of severity levels may be different; the reporting and urgent thresholds may change; time-stamps may be replaced by time-delta or eliminated altogether. In some embodiments, performance notification fields 304 may comprise compressed representation of the corresponding performance indications.

Figure 4:
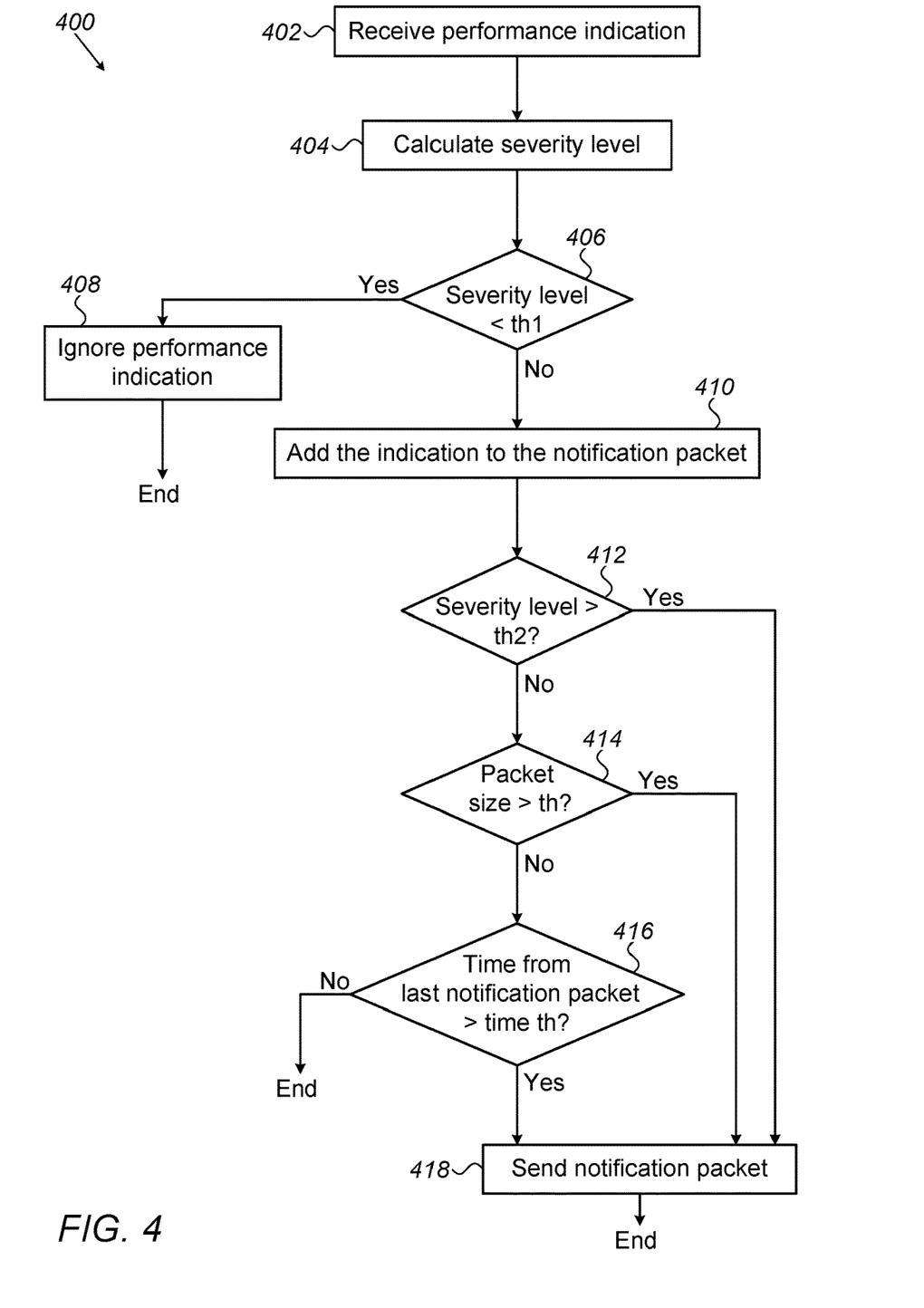
FIG. 4 is a flow chart that schematically illustrates a method for generating and sending performance notification packets, in accordance with an embodiment of the present invention.

FIG. 4 is a flow-chart 400 that schematically illustrates a method for generating and sending performance notification packets, in accordance with an embodiment of the present invention. The flow-chart is executed by the NIC in general, wherein some of the steps may be executed by various units of the NIC (that were described with reference to FIG. 2), as will be described hereinbelow.

The flow-chart starts at a Receiving Performance Indication step 402, wherein HDMU 202, generates a performance indication. Next, the NIC enters a Calculating Severity Level step 404, wherein the Classifier calculates the severity level of the performance indication, for example, using weighted average. Next, the NIC enters a First Severity Comparison step 406, wherein the Classifier checks whether the severity of the performance monitoring event is less than a First Threshold. If the severity level is less than the First Threshold, no notification should be generated—the NIC enters an Ignoring Performance Indication step 408, and the flow-chart ends.

If, at step 406, the severity level of the performance indication is no less than the First Threshold, the NIC will enter an Adding Indication to Packet step 412, wherein Packet Encapsulator 208 adds the performance indication to the performance notification packet. In some embodiments adding the performance indication comprises compressing the indication and adding a compressed representation of the performance indication to the packet. In an embodiment, adding the performance indication comprises adding a time-stamp. In other embodiments, the Packet Encapsulator adds a time step after adding a plurality of performance indicators, or after a preset time period.

After Step 410, the NIC enters a Second Severity Comparison step 412, wherein the Classifier compares the severity of the performance monitoring indicator to a Second Threshold. If the severity of the performance monitoring indicator exceeds the second Threshold (i.e., the performance indicator is Urgent), the NIC enters a Sending Notification Packet step 418, whereas if the severity of the performance monitoring indicator does not exceed the Second Threshold, the NIC will enter a Packet Size Comparison step 414.

At Packet Size Comparison step 414, if the packet size at the Packet Encapsulator exceeds a Size Threshold, the packet is ready to be sent, and the NIC will enter Sending Notification Packet step 418; whereas if packet size at the Packet Encapsulator does not exceed the Size Threshold, the NIC will enter a Checking Elapsed Time step 416.

If, at step 416, the elapsed time since the NIC has sent the last performance notification packet exceeds a Time Threshold, the NIC will enter Sending Notification Packet step 418, whereas if the elapsed time since the NIC has sent the last performance notification packet does not exceed the Time Threshold, the flow-chart will end.

At Sending Notification Packet step 418, the Packet Encapsulator closes the packet, and sends the packet to an Egress port, and the flow-chart ends. In some embodiments, closing the packet comprises adding a packet header; in other embodiments, the header is added after the NIC sends the previous performance notification packet, and closing the packet comprises filling missing fields of the header like packet length.

Thus, according to the flowchart described in the example embodiment of FIG. 4, high timing definition performance notification indicators are processed by the NIC, which sends out only important data, in long packets (except when a performance indicator that is deemed urgent occurs). The load on the network pertaining to performance monitoring is small.

As would be appreciated, the flow-chart described in FIG. 4 is an example flow-chart that is shown purely for the sake of conceptual clarity. Any other suitable flowchart may be used in alternative embodiments of the present invention. For example, the steps of the flow-chart may be executed in a different order; some or all the steps may be done at the same time; and, thresholds may change dynamically in response to the accumulated severity of the performance indicators, in response to the NIC temporal load, or in response to threshold modification requests that the NIC may receive, for example, from the local CPU, or from the Performance Monitoring Server.

The configuration of NIC 100, including HDMU 202, Classifier 206, Packet Encapsulator 208 and Scheduler 210, the structure of performance notification packet 106 and flow-chart 400, shown in FIGS. 2, 3 and 4, are example configurations that are shown purely for the sake of conceptual clarity. Any other suitable configurations can be used in alternative embodiments. In some embodiments, performance monitoring may comprise a hierarchy of servers in at least two levels, wherein level-1 performance monitoring servers monitor the performance of groups of monitored servers, process the performance data, compress the data in a manner which may be similar to the methods described herein, and forward the compressed data to the next level, and so on.

The different elements of NIC 100, such as HDMU 202, Classifier 206, Packet Encapsulator 208 and Scheduler 210, may be implemented using suitable hardware, such as in one or more Application-Specific Integrated Circuits (ASICs) or Field-Programmable Gate Arrays (FPGAs), using software, using hardware, or using a combination of hardware and software elements.

In some embodiments, some or all of the performance monitoring functions of NIC 104 and/or NIC 200 may be implemented in one or more general-purpose programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a Network Interface Controller (NIC) that communicates over a network, generating indications pertaining to a performance of the NIC;
   classifying the indications with respect to severity;
   assembling at least some of the indications, for which the severity exceeds a predefined severity threshold, in performance notification packets; and
   sending the performance notification packets over the network.

2. The method according to claim 1, wherein sending the performance notification packets comprises evaluating a sending criterion, and sending the performance notification packets when the sending criterion is met.

3. The method according to claim 2, wherein evaluating the sending criterion comprises evaluating a size of a performance notification packet.

4. The method according to claim 2, wherein evaluating the sending criterion comprises evaluating a time elapsed since a last performance notification packet was sent.

5. The method according to claim 2, wherein evaluating the sending criterion comprises evaluating the severity of a performance indicator.

6. The method according to claim 1, wherein assembling the indications comprises compressing the indications.

7. The method according to claim 1, wherein assembling the indications comprises adding one or more time-stamps to the performance notification packets.

8. A Network Interface Controller (NIC), comprising:
   one or more ports for communicating over a network; and
   circuitry, configured to generate indications pertaining to a performance of the NIC, to classify the indications with respect to severity, to assemble at least some of the indications, for which the severity exceeds a predefined severity threshold, in performance notification packets, and to send the performance notification packets over the network.

9. The NIC according to claim 8, wherein the circuitry is further configured to evaluate a sending criterion for the performance notification packets, and to send the performance notification packets when the sending criterion is met.

10. The NIC according to claim 9, wherein the circuitry is configured to evaluate the sending criterion by evaluating a size of a performance notification packet.

11. The NIC according to claim 9, wherein the circuitry is configured to evaluate the sending criterion by evaluating a time elapsed since a last performance notification packet was sent.

12. The NIC according to claim 9, wherein the circuitry is configured to evaluate the sending criterion by evaluating a severity of a performance indicator.

13. The NIC according to claim 8, wherein the circuitry is further configured to compress the performance notification packets.

14. The NIC according to claim 8, wherein the circuitry is further configured to add one or more time-stamps to the performance notification packets.

* * * * *